(12) United States Patent
Allen et al.

(10) Patent No.: US 10,457,333 B1
(45) Date of Patent: Oct. 29, 2019

(54) RIGHT-HAND DRIVE DASH ASSEMBLY AND CONVERSION PROCESS

(71) Applicant: SportChassis, LLC, Clinton, OK (US)

(72) Inventors: Macolm Allen, Cordell, OK (US); James Burnam, Clinton, OK (US); Chris Brinkley, Clinton, OK (US); Nicholas Walenciak, Weatherford, OK (US)

(73) Assignee: SportChassis, LLC, Clinton, OK (US)

( * ) Notice: Subject to any disclaimer, the term of this patent is extended or adjusted under 35 U.S.C. 154(b) by 70 days.

(21) Appl. No.: 15/225,775

(22) Filed: Aug. 1, 2016

Related U.S. Application Data

(60) Provisional application No. 62/200,007, filed on Aug. 1, 2015.

(51) Int. Cl.
| | | |
|---|---|---|
| *B62D 25/14* | (2006.01) | |
| *B60R 13/02* | (2006.01) | |
| *B60K 37/04* | (2006.01) | |
| *B60R 13/08* | (2006.01) | |
| *B60T 7/08* | (2006.01) | |
| *B62D 1/16* | (2006.01) | |
| *B60H 1/24* | (2006.01) | |

(52) U.S. Cl.
CPC ............ *B62D 25/142* (2013.01); *B60H 1/242* (2013.01); *B60K 37/04* (2013.01); *B60R 13/0256* (2013.01); *B60R 13/083* (2013.01); *B60T 7/08* (2013.01); *B62D 1/16* (2013.01)

(58) Field of Classification Search
CPC ........ B60K 37/04; B62D 25/142; B62D 1/16; B60R 13/083; B60R 13/0256; B60T 7/08; B60H 1/242
See application file for complete search history.

(56) References Cited

U.S. PATENT DOCUMENTS

| | | |
|---|---|---|
| 3,946,826 A | 3/1976 | Guhl |
| 6,085,609 A | 7/2000 | Mozingo |
| 6,260,914 B1 | 7/2001 | Nieminski |
| 6,276,476 B1 | 8/2001 | Fanwell |
| 6,276,739 B1 | 8/2001 | Wich |
| 2002/0145309 A1* | 10/2002 | Shikata .............. B60H 1/00528 296/208 |

* cited by examiner

*Primary Examiner* — D Glenn Dayoan
*Assistant Examiner* — Melissa A Black
(74) *Attorney, Agent, or Firm* — Sean O'Connell, PLLC

(57) ABSTRACT

A right-hand drive conversion for a medium duty truck. The conversion process includes removal of dash assembly components and a sub-dash from the cab of a medium duty truck, such as a Freightliner M2. The conversion dash assembly includes a unitary dash and a plurality of brackets. The brackets are mounted to the left and right cab walls and the firewall.

2 Claims, 9 Drawing Sheets

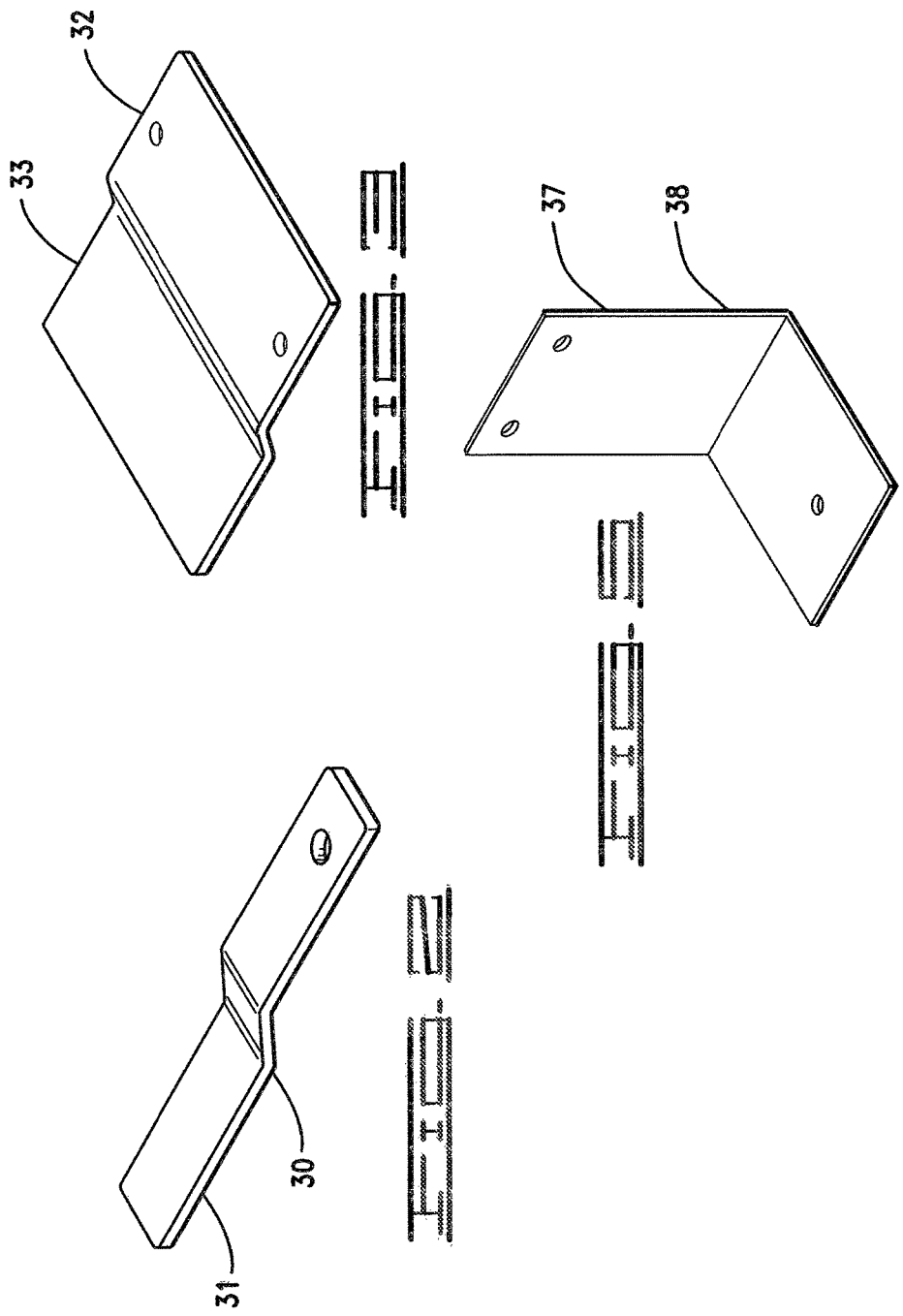

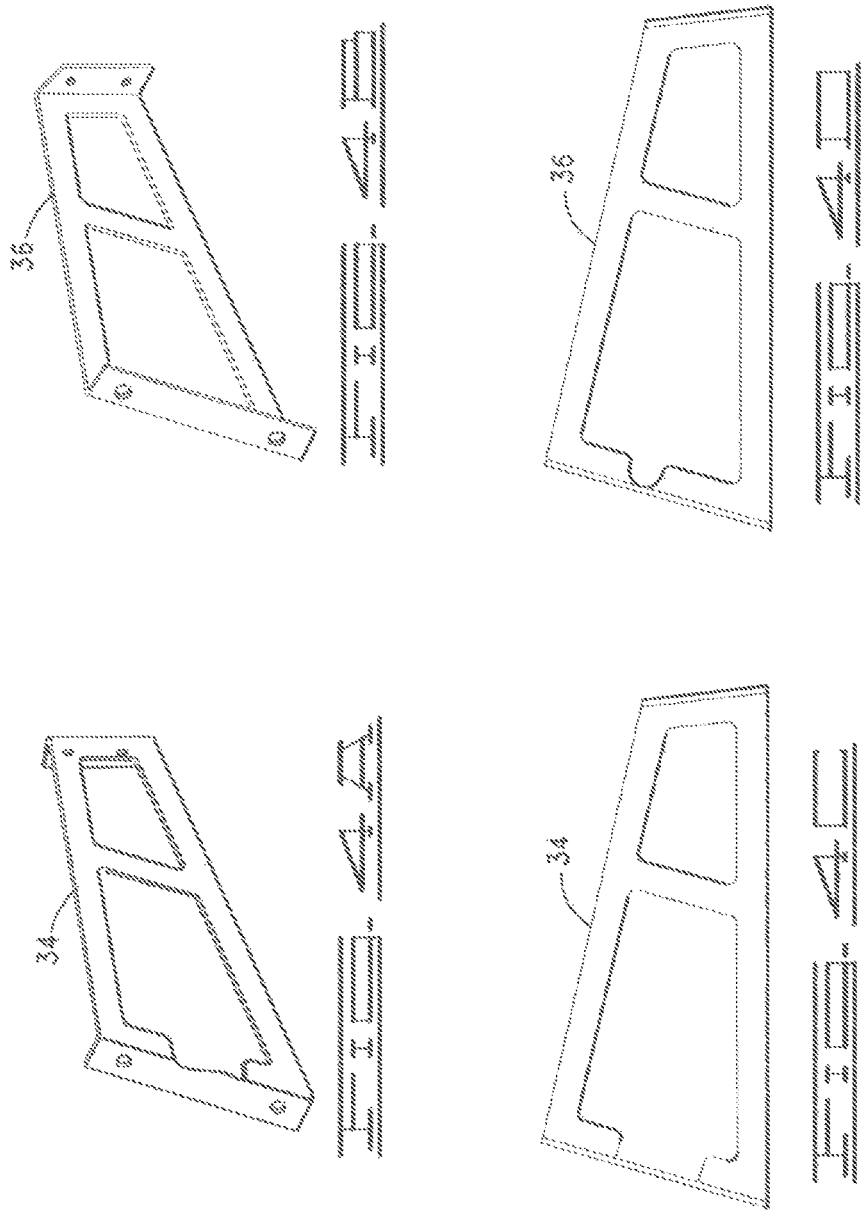

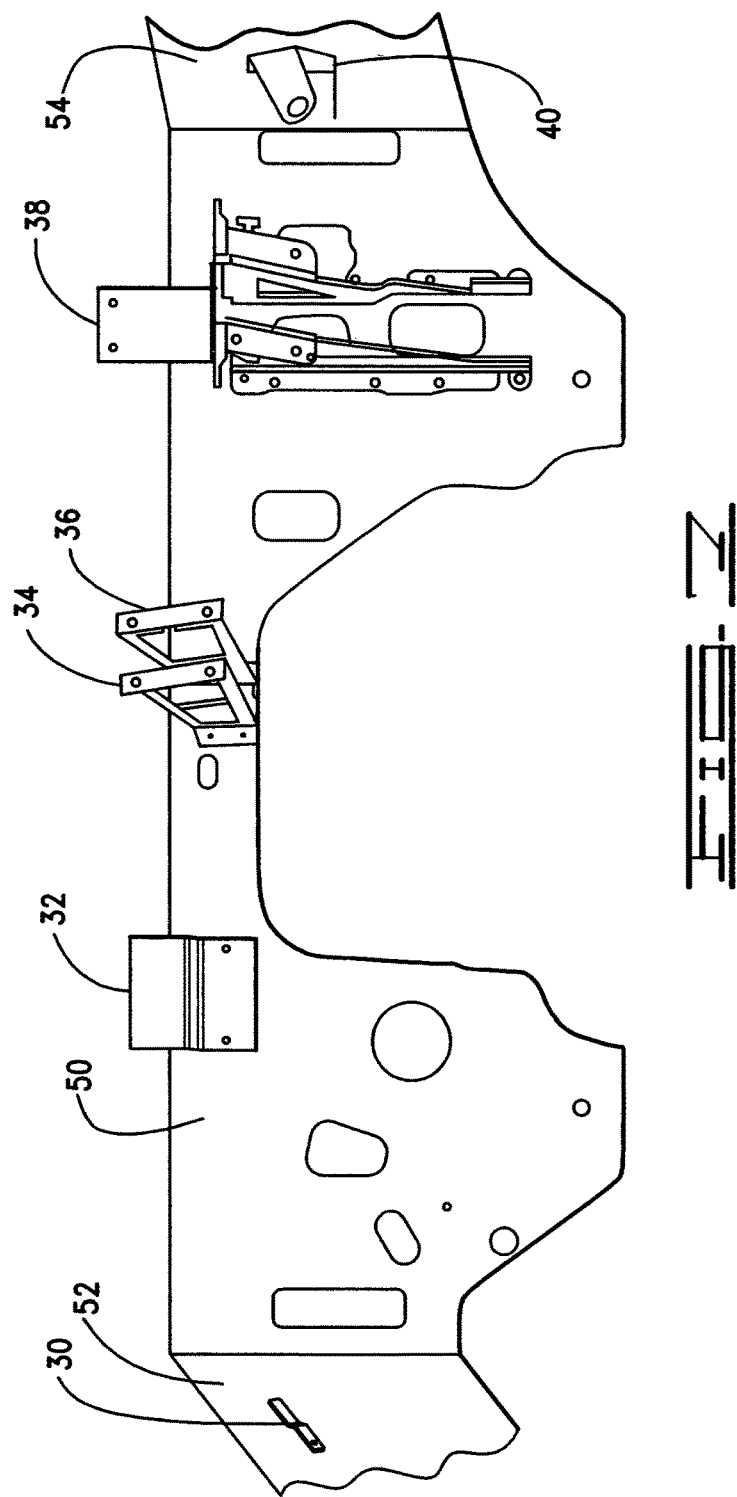

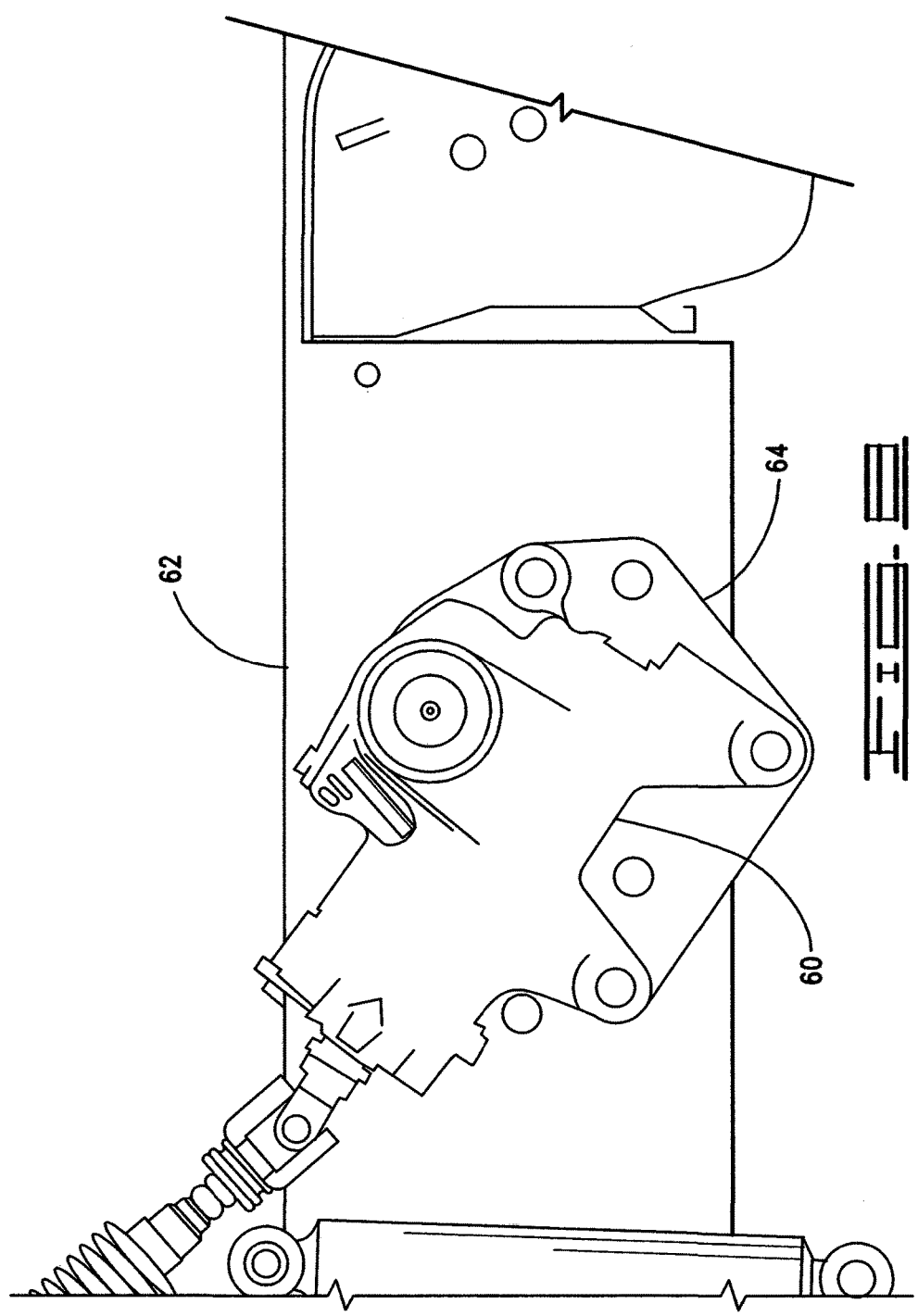

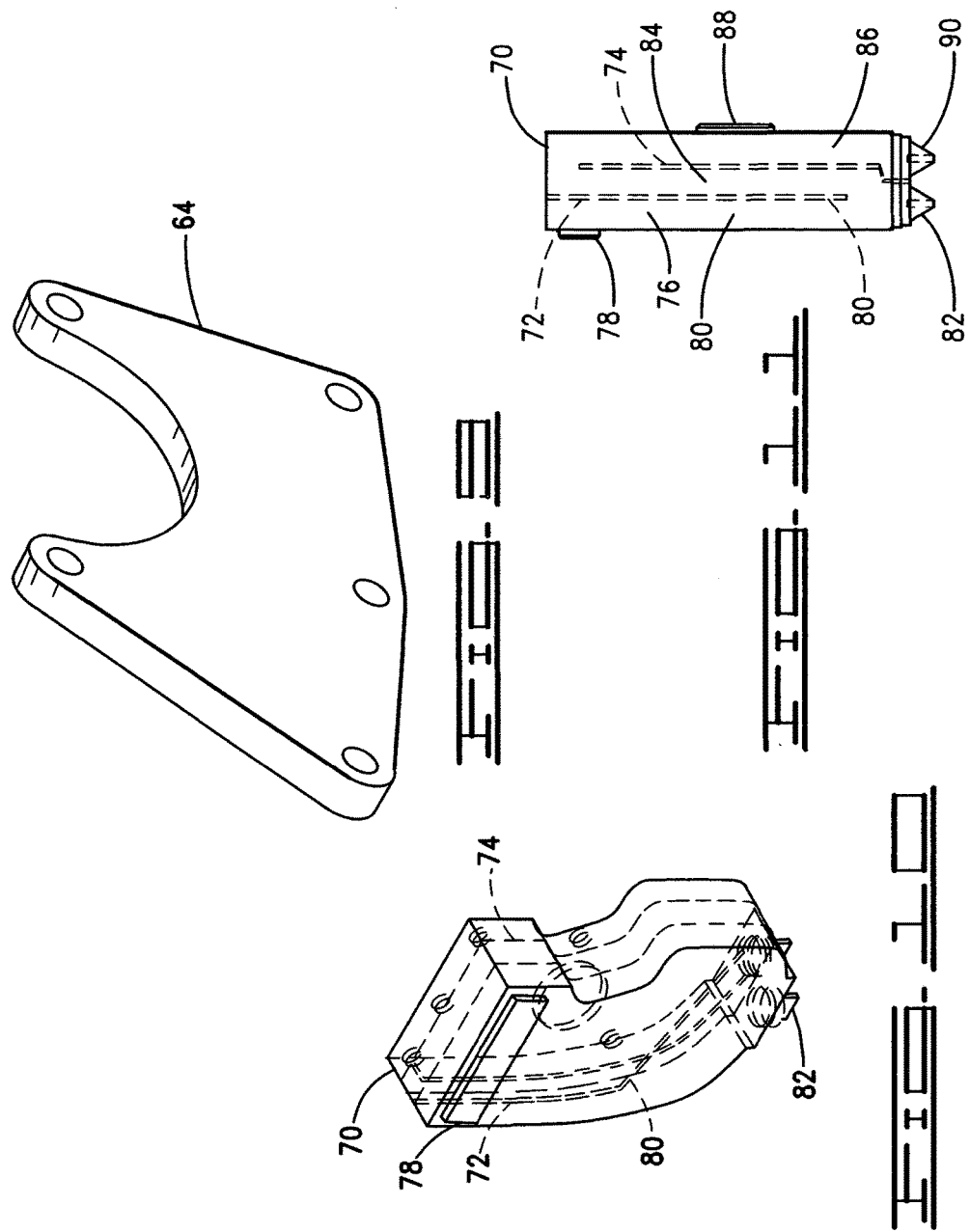

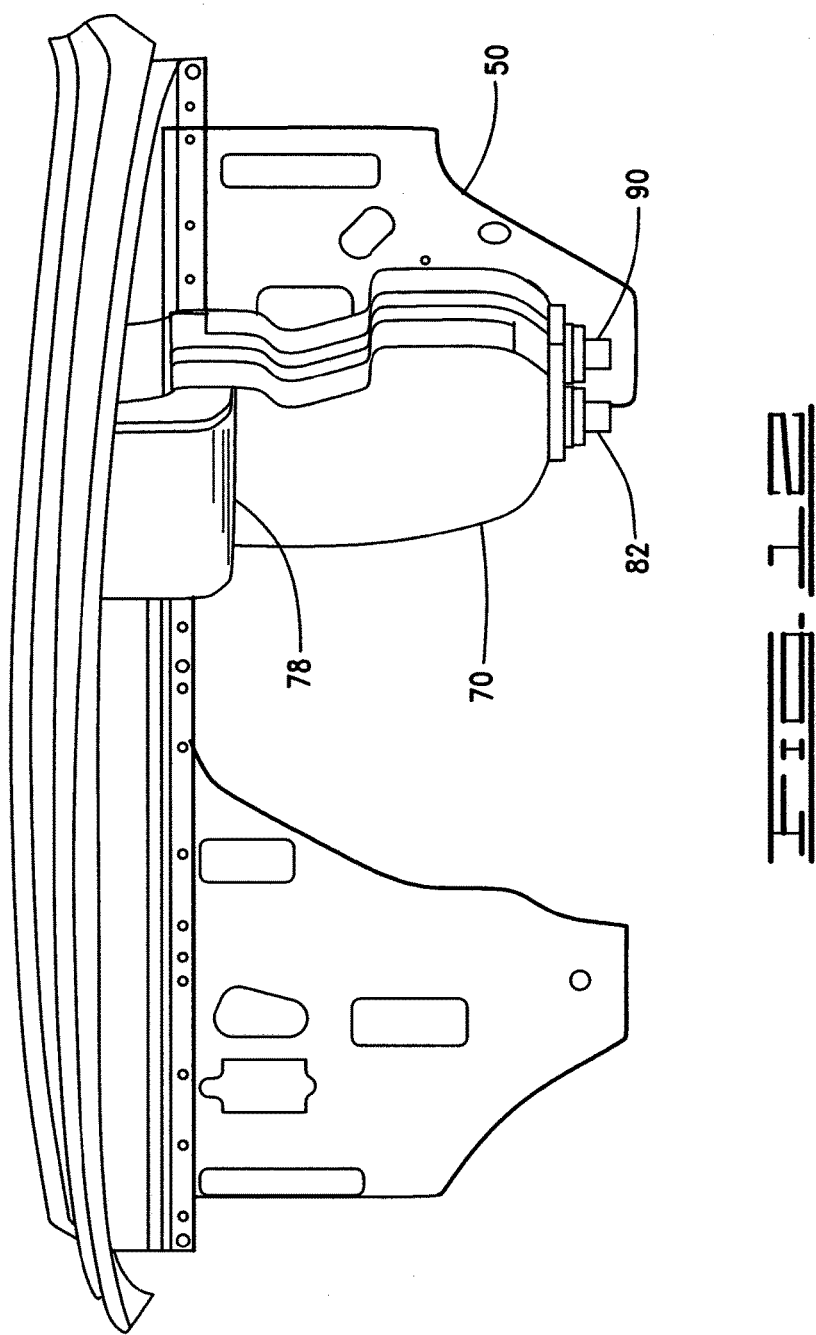

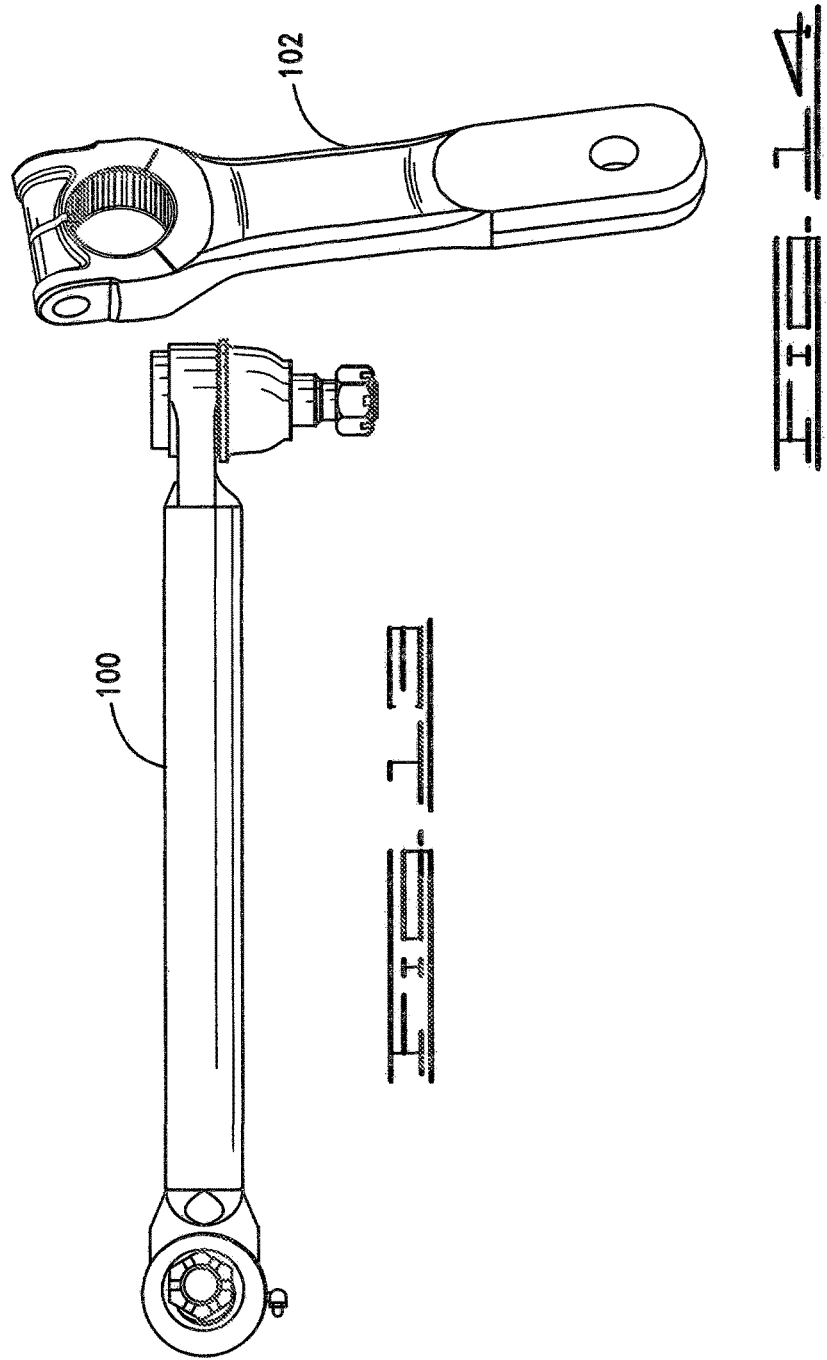

RIGHT-HAND DRIVE DASH ASSEMBLY AND CONVERSION PROCESS

FIELD OF THE INVENTION

The present invention relates to right hand drive vehicles and more particularly to the conversion of left hand drive medium duty trucks.

BACKGROUND OF THE INVENTION

Right-hand drive vehicles are used in many foreign countries. Right-hand drive vehicles are also used domestically, finding particular benefit in medium duty trucks used for waste management, street sweepers, or the like. For obtaining right-hand drive medium duty trucks domestically, conversion of OEM left-hand drive vehicles to right-hand drive is economically advantageous. Conversion of left-hand drive trucks requires removal and modification of the OEM parts and creation of conversion parts.

SUMMARY OF THE INVENTION

The present invention is directed to a right-hand drive dash assembly for use in a cab of a medium duty truck. The assembly comprises a main dash, a left bracket, a center bracket, a steering column bracket, a right bracket, and a plurality of park brake mount brackets. The main dash has a bottom surface, a left side, a right side, and a back edge. The left bracket is secured to the left side of the dash, the left bracket connectable to a left side cab wall. The center bracket is secured to the back edge of the dash. The steering column bracket is secured to the back edge of the dash, the steering column bracket connectable to a steering column mount. The right bracket is secured to the right side of the dash, the right bracket connectable to a right side cab wall. The plurality of park brake mount brackets are secured to the bottom surface of the dash In an alternative embodiment the invention is directed to a right-hand drive dash assembly for use in a cab of a medium duty truck. The assembly comprising a firewall, a unitary main dash having a bottom surface, a left side, a right side, and a back edge, a left bracket, a center bracket, a steering column bracket, and a right bracket. The left bracket is secured to the left side of the dash, with the left bracket connectable to a left side cab wall. The center bracket is secured to the back edge of the dash and connectable to the firewall. The steering column bracket is secured to the back edge of the dash, with the steering column bracket connectable to a steering column mount. The right bracket is secured to the right side of the dash, with the right bracket connectable to a right side cab wall.

In yet another embodiment the invention is directed to a right-hand drive dash assembly for use in a cab of a medium duty truck. The assembly comprising a firewall, a unitary main dash, a left bracket, a center bracket, a steering column bracket, a right bracket, and a water separator secure to the firewall. The unitary dash has a a bottom surface, a left side, a right side, and a back edge. The left bracket is secured to the left side of the dash, with the left bracket connectable to a left side cab wall. The center bracket is secured to the back edge of the dash and connectable to the firewall. The steering column bracket is secured to the back edge of the dash, with the steering column bracket connectable to a steering column mount. The right bracket is secured to the right side of the dash, with the right bracket connectable to a right side cab wall. The water separator comprises a housing having a top portion and a bottom portion, an intake opening on a first side of the housing, a primary baffle disposed vertically in the housing and extending from the top portion to a position proximate the bottom portion, a second baffle disposed laterally adjacent the primary baffle and extending from the bottom portion to a position proximate the top portion; and an HVAC intake disposed on a second side of the housing.

BRIEF DESCRIPTION OF THE DRAWINGS

FIG. 2 illustrates a left bracket for use with the assembly of FIG. 1.

FIG. 3 illustrates a center bracket for use with the assembly of FIG. 1.

FIGS. 4A and 4B are perspective views of park brake valve brackets for use with the assembly of FIG. 1.

FIGS. 4C and 4D are plan views of the park brake valve brackets shown in FIGS. 4A and 4B.

FIG. 6A is a perspective view of a right bracket for use with the assembly of FIG. 1.

FIG. 6B is a plan view of the right bracket shown in FIG. 6A.

FIG. 7 is an illustration of the bracket placement for the assembly of FIG. 1.

FIG. 8 is an illustration of the steering gear mount for use with the present invention.

FIG. 9 is a steering gear mounting plate for use with the configuration shown in FIG. 8.

FIG. 10 is a perspective view of an HVAC water separator for use with the present invention.

FIG. 11 is a side plan view of the water separator of FIG. 10.

FIG. 12 illustrates the water separator of FIG. 10 installed on a firewall.

FIG. 13 shows a draglink for use with the present invention.

FIG. 14 shows a pitman arm for use with the present invention.

DETAILED DESCRIPTION OF THE INVENTION

The preferred embodiment of the present invention is directed to the conversion of a left-hand drive medium duty truck to a single steering position right-hand drive. More preferably, the present invention is directed to the conversion of a Freightliner M2 model truck, though the principles and parts used herein may be adapted to other vehicles. The present invention requires the removal and modification of the certain parts and creation of other conversion parts.

Figure 1:
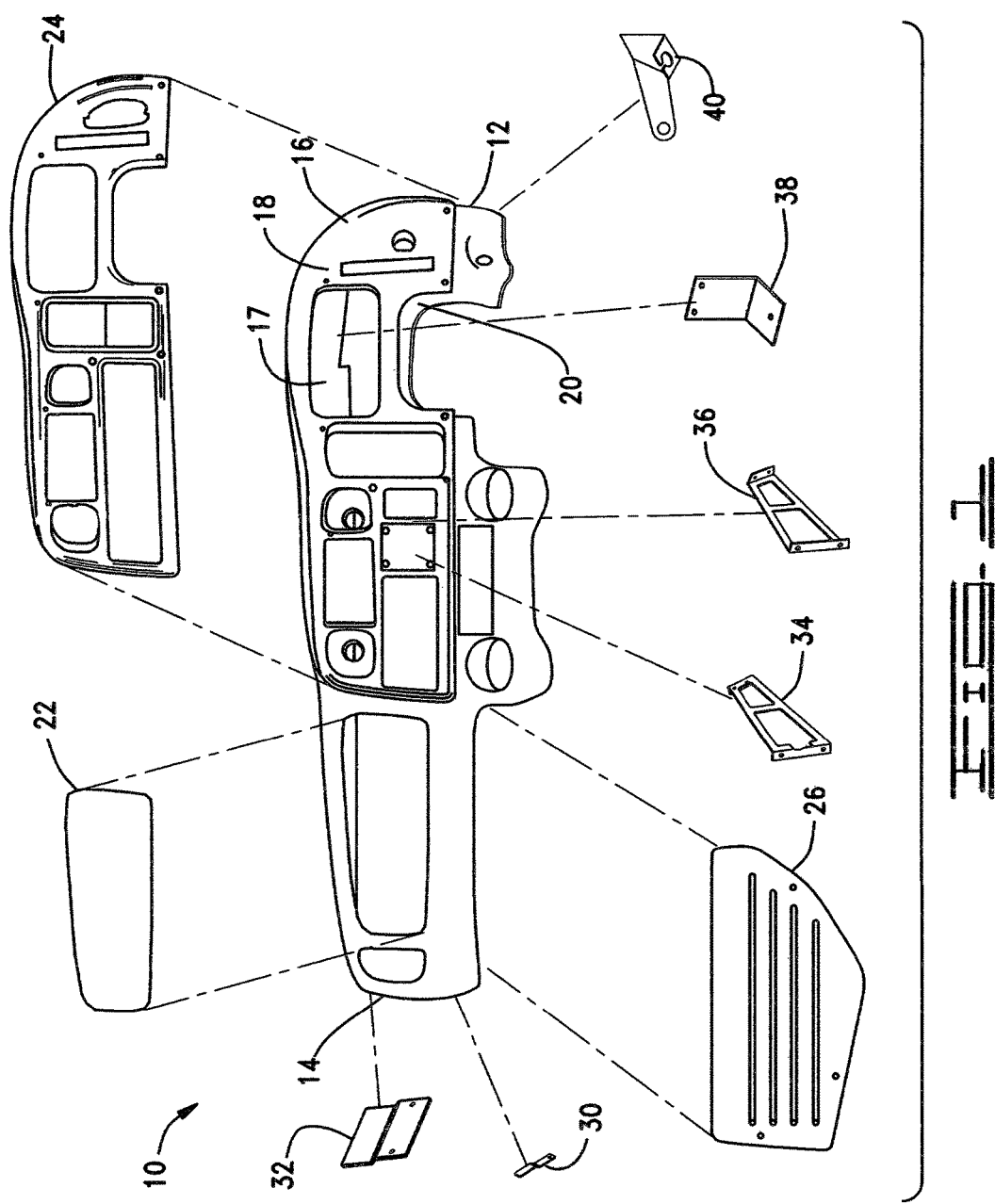
FIG. 1 is a view of a right-hand drive dash assembly built in accordance with the present invention.

With reference now to the drawings in general and to FIG. 1 in particular, there is shown therein a preferred embodiment for a right-hand drive dash assembly 10 constructed in accordance with the present invention. The dash assembly 10 comprises new parts to replace dash components removed from a left-hand drive medium duty truck. The dash assembly 10 comprises a unitary main dash 12 for installation in a cab of a medium duty truck. Preferably, the main dash 12 is formed of ABS plastic. The dash 12 has a left side 14, a right side 16, a back edge 17, and a top surface 18. The top surface 18 provides access for a plurality of traditional dah panel components, including a radio, transmission shifter, instrument clusters, and switches. Consistent with a right-hand drive vehicle, the dash 12 includes a steering column recess 20 proximate the right side 16 of the dash, defining a position for a steering column (not shown) and steering wheel (not shown).

The dash assembly 10 further comprises a passenger side access panel 22, an instrument control center trim bezel 24, and an HVAC cover 26, all secured to the top surface 18 of the dash 12. The access panel 22 is secured to the top surface 18 of the dash 12 proximate the left side 14 of the dash. The trim bezel 24 is secured to the top surface 18 of the dash 12 and provides trim for various instruments and switches on the dash. The HVAC cover 26 is secured proximate the left side of the dash 12.

The dash assembly 10 of the present invention is unlike the dash removed from the left-hand drive truck which includes a sub-dash assembly bolted or affixed directly to the firewall of the truck and a plurality of dash pieces secured to the sub-dash. Of notable difference, the dash 12 of the present invention is a unitary piece and does not require a sub-dash. In this way, the dash 12 only has incidental contact with the firewall of the truck. This unitary construction of the dash 12 allows advantages over the traditional left-hand drive dash being replaced. Particularly, the dash 12 of the present invention can be assembled prior to installation in the truck, permitting the right-hand drive conversion procedure to be performed quickly.

In the preferred embodiment, installation of the dash 12 in the cab of the truck is accomplished using a plurality of brackets. The dash assembly 10 thus further comprises a left dash bracket 30, a center dash bracket 32, a plurality of park brake control valve dash brackets 34 and 36, a steering column dash bracket 38, and a right dash bracket 40. The brackets 30, 32, 34, 36, 38, and 40 are preferably formed of ABS plastic so that the brackets may be chemically welded to the dash 12. With reference to FIGS. 2-6, the brackets for the dash assembly 10 are shown in detail.

Referring to FIG. 2, the left dash bracket 30 is shown. A first end 31 of the bracket 30 is secured to the left side 14 of the dash 12. The bracket 30 preferably comprises a substantially rectangular strip bracket. More preferably the bracket 30 is bent to allow the bracket as installed to rest flush against the left side 14 of the dash 12 and a left side wall of the truck cab, as yet to be described. Referring now to FIG. 3, the center dash bracket 32 is shown. A first end 33 of the bracket 32 is secured to the back edge 17 of the dash 12. Preferably the bracket 32 comprises a substantially square bracket. More preferably the bracket 32 is bent to allow the bracket as installed to rest flush against the back edge 17 of the dash 12 and a firewall of the truck cab, as yet to be described.

Turning now to FIGS. 4A, 4B, 4C, and 4D, the park brake valve brackets 34 and 36 are shown. Preferably the brackets comprise a left bracket 34 and a right bracket 36. More preferably the brackets 34 and 36 are secured to a bottom side of the dash 12 proximate where the park brake valve (not shown) protrudes through the firewall. The brackets 34 and 36 help with the force applied to the park brake valve when applying or releasing the park brake. In the preferred embodiment, the valve and the brackets 34 and 36 share the same mounting bolts and are secured together while being secured to the main dash 12

Figures 5A, 5B:
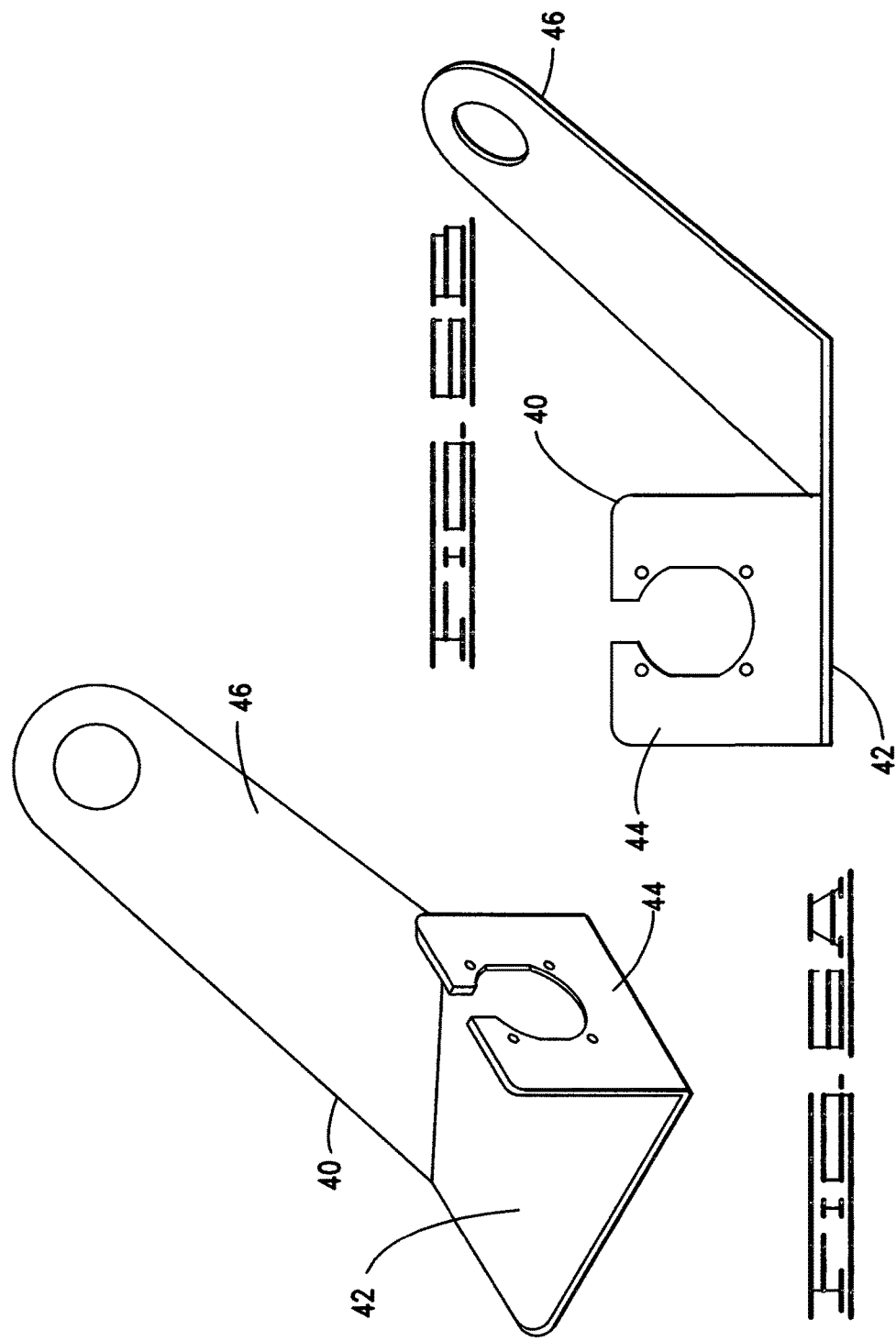
FIG. 5 is a steering column bracket for use with the assembly of FIG. 1.

Referring to FIG. 5, shown therein is the steering column bracket 38. Preferably, the bracket 38 comprises a right angle bracket. A first end 39 of the bracket 38 is preferably secured to the back edge 17 of the dash 12 proximate the steering column recess 20. With reference to FIGS. 6A and 6B, the right bracket 40 serves the purpose of securing the dash 12, and providing support for the truck ignition (not shown) and the on-board diagnostics (referred to herein as OBD) receptacle (not shown). The right bracket 40 includes a cab side plate 42, an OBD support plate 44, and an ignition support arm 46. Preferably, the OBD support plate 44 is perpendicular to the cab side plate 42. Preferably, the ignition support arm 46 forms an obtuse angle to the side plate 42.

With reference now to FIG. 7, there is shown therein a representation of the position of the dash assembly 10 brackets relative to a firewall 50, a left cab side wall 52 and a right cab side wall 54 of the cab of the truck. The left bracket 30 is connectable to the left cab side wall 52. The center bracket 32 is connectable to the firewall 50. The park brake brackets 34 and 36 are secured to the firewall 50 proximate the park brake valve components (not shown). The right bracket 40 is secured to the right cab side wall 54.

A preferred process for securing the dash 12 in the cab with the brackets 30, 32, 34, 36, 38, and 40 follows. The dash 12 is prepared by installing the park brake control valve (not shown). During this installation, the park brake valve brackets 34 and 36 are affixed to a back side of the dash 12 using a chemical welding process with ABS glue. The center bracket 32 is chemically welded to the dash 12 at a location proximate an opening for the access panel 22. The right bracket 40 is attached to the dash 12 when installing the ignition switch (not shown) in the dash. The dash 12 may be installed only after the ABS glue has completely set, preferably overnight.

When the ABS glue has set, the dash 12 is set into place in the vehicle. The right bracket 40 is attached to the right cab side wall 54, just loosely enough so the bracket may pivot on the mounting bolt. This will aid in proper alignment of the dash 12. When proper alignment is attained, the dash 12 is affixed to the firewall 50 of the cab, with self-tapping screws. At this point, the right bracket 40 is fully tightened to the cab side wall 54. The park brake control valve dash brackets 34 and 36 are also affixed to the firewall 50 with self-tapping screws, at this time. The steering column dash bracket 38 is now affixed to the steering column mount and to the dash 12, using the approved method. ABS glue is applied to the left dash bracket 30 at the point where it will contact the dash 12 and immediately installed in the proper location.

Turning now to FIG. 8, shown therein is an installation location for a right-hand drive steering gear 60 in accordance with the present invention. One skilled in the art will appreciate in a traditional international steering shaft configuration, steering gears are generally mounted to the vehicle frame. Often with a medium duty truck it is desirable to have improved steering radius. This improvement can be achieved by mounting the steering gear 60 off of the truck frame. In accordance with the present invention, the steering gear 60 is positioned off of the frame 62 using a steering gear mounting plate 64. The plate 64 is secured between the frame 62 and the gear 60, providing the desired separation. With reference to FIG. 9, the steering gear mounting plate is shown in greater detail. The plate 64 comprises a plate of desired thickness with mounting holes 65 to separate the gear 60 from the frame 62.

Referring now to FIGS. 10-12, shown therein is a preferred embodiment for an alternative HVAC water separator 70 for use with the present invention. The water separator 70 comprises a housing designed with dual internal baffles 72 and 74, creating three chambers. The primary baffle 72 is disposed in the separator 70, extending vertically from a top portion of the separator to a position proximate a bottom of the separator. The second baffle 74 is disposed in the separator 70 laterally adjacent to the primary baffle 72. The second baffle extends vertically from the bottom of the separator 70 to a position proximate the top of the separator. "Wet" air enters a primary chamber 76 through an intake opening 78, striking the primary baffle 72. Wet air is directed downward in the separator 70. The primary baffle 72 is angled at a bottom end 80, encouraging gravity separation of water from the air. Water directed to the bottom 80 of the primary chamber 78 exits the separator 70 through a primary drain 82. The air flow encounters the second baffle 74, and is directed upward (first flow reverse) into an intermediate chamber 84. The upward path continues until air flows over the top of the second baffle 74 (second flow reverse), into a third chamber 86. The flow is then directed downward, into the HVAC intake 88. Water reaching the third chamber 86 is directed to a bottom of that chamber, exiting the separator 70 through a secondary drain 90. As shown in FIG. 12, the water separator 70 is installed on the engine compartment side of the firewall 50. The intake opening 78 is positioned adjacent a cowl for access to open air, while the HVAC intake 88 is positioned against the firewall 50 for air communication with the HVAC components (not shown) in the cab of the truck.

Turning now to FIGS. 13 and 14, there is shown therein modified components for the steering mechanism of the right-hand drive conversion of the present invention. FIG. 13 illustrates a modified draglink 100 for use with the present invention. The draglink 100 is modified version of a left-hand drive draglink, modifying the overall length and the orientation of the ends of the draglink. Shown in FIG. 14 there is a modified pitman arm 102 for use with the present invention. The pitman arm 102 is modified as to a timing mark only on the arm. The timing mark is the line or dash that originates at a point on the circumference of the serrated hole at the top of the arm 102. There are two timing marks as illustrated; one for left hand drive use and one for right-hand drive use.

A preferred method for converting a left-hand drive medium duty truck to a right-hand drive is illustrated as follows. The procedure as described works advantageously with conversion of a Freightliner M2 truck but may be adapted for use with other medium duty trucks as well. Initially the batteries are disconnected, engine coolant is drained, and refrigerant and oil is recovered from the HVAC system while observing all applicable guidelines and regulations. Next, remove the seats and remove interior flooring. The air cleaner assembly and engine intake duct are removed. To prevent contaminants from entering the turbocharger, seal the open end. Then the coolant expansion tank, heater pipes and hoses, AC hoses and j-bracket to the HVAC unit, the air cleaner mount on the firewall, and the HVAC fresh air intake plenum are removed. Be sure to capture and measure the amount of any oil that may still be in the AC hoses, so the proper amount of oil may be returned to the AC system upon recharging. The expansion valve to the HVAC unit, compressor ports, and filter/dryer ports are all capped to avoid contamination.

Next the A-pillar covers, complete dash, lower trim pieces, Wabco computer, various switches, transmission and A/C controllers, park brake valve, and HVAC main unit are to be removed. The interior cab harness is next removed. Disconnect all air lines to the foot brake valve and remove the valve. Remove the steering column and mount and the right front fender assembly and right front wheel. Remove the windshield washer tank and pump assembly. Finally, detach the tie-rod from the right steering knuckle and remove the steering knuckle and brake components from the axle.

Now mount the right-hand drive steering gear to the right side frame. A modified right-hand steering knuckle, with a new right-hand steering arm, and all axle components can now be installed. A modified pitman arm and new right-hand drive draglink are now installed.

Wiring is now disconnected and PDMs on left front fender are removed so that the fender can be removed. Drain the power steering fluid from the reservoir and the steering gear. Remove the power steering reservoir and power steering high and low pressure hoses. Next remove the steering shaft, the steering gear, the pitman arm, the draglink, and the steering arm.

Now the power steering reservoir and windshield washer tank are mounted to the left side frame. New power steering high and low pressure hoses are next installed.

Next disconnect wiring to and remove the bulkhead module. Remove the engine compartment frontwall harness, windshield wiper arms, wiper motor and linkage, and washer tubing. The harness and wiring, wiper arms, and motor linkage can now be modified appropriate for a right-hand drive. The right and left sides of the firewall can be modified using templates as shown. The cowl can be removed and modified for use with the right-hand drive. The wiper motor and linkage assembly and air cleaner mount can now be installed to the exterior firewall. The cowl cover can now be installed and flooring re-installed in its original position.

Install the steering column assembly, foot brake valve and pedal, bulkhead module, accelerator pedal assembly and HVA main unit, and interior firewall harness all to the interior firewall. The right-hand drive steering shaft can also be installed. Next install the right-hand drive dash as described. All interior trim, dash switches and electrical components, and the park brake valve can now be installed. This is followed by installation of seats and front fenders.

Next the exterior frontwall harness is installed, and PDMs are install on the front left fender. The new expansion tank and HVAC fresh air intake, and transmission computer are now installed to the exterior firewall. Finally, remaining heater pipes and hoses, refrigerant hoses for the main HVAC unit, and hoses and sensor wiring for the expansion tank are installed. Fluids may be refilled and AC system may be recharged to prepare the vehicle for starting.

Various modifications can be made in the design and operation of the present invention without departing from the spirit thereof. Thus, while the principal preferred construction and modes of operation of the invention have been explained in what is now considered to represent its best embodiments, which have been illustrated and described, it should be understood that the invention may be practiced otherwise than as specifically illustrated and described.

What is claimed is:

1. A right-hand drive dash assembly for use in a cab of a medium duty truck, the assembly comprising:
    a firewall;
    a unitary main dash having a bottom surface, a left side, a right side, and a back edge;
    a left bracket secured to the left side of the dash, the left bracket connectable to a left side cab wall;
    a center bracket secured to the back edge of the dash and connectable to the firewall;
    a steering column bracket secured to the back edge of the dash, the steering column bracket connectable to a steering column mount;

a right bracket secured to the right side of the dash, the right bracket connectable to a right side cab wall; and a water separator comprising:
- a housing having a top portion and a bottom portion;
- an intake opening on a first side of the housing;
- a primary baffle disposed vertically in the housing, extending from the top portion to a position proximate the bottom portion;
- a second baffle disposed laterally adjacent the primary baffle, extending from the bottom portion to a position proximate the top portion; and
- an HVAC intake disposed on a second side of the housing.

2. A right-hand drive dash assembly for use in a cab of a medium duty truck, the assembly comprising:

a firewall;

a unitary main dash having a bottom surface, a left side, a right side, and a back edge;

a left bracket secured to the left side of the dash, the left bracket connectable to a left side cab wall;

a center bracket secured to the back edge of the dash and connectable to the firewall;

a steering column bracket secured to the back edge of the dash, the steering column bracket connectable to a steering column mount;

a right bracket secured to the right side of the dash, the right bracket connectable to a right side cab wall; and a water separator secured to the firewall, the water separator comprising:
- a housing having a top portion and a bottom portion;
- an intake opening on a first side of the housing;
- a primary baffle disposed vertically in the housing, extending from the top portion to a position proximate the bottom portion;
- a second baffle disposed laterally adjacent the primary baffle, extending from the bottom portion to a position proximate the top portion; and
- an HVAC intake disposed on a second side of the housing.

\* \* \* \* \*